United States Patent
Fraser et al.

(10) Patent No.: US 6,707,819 B1
(45) Date of Patent: Mar. 16, 2004

(54) METHOD AND APPARATUS FOR THE ENCAPSULATION OF CONTROL INFORMATION IN A REAL-TIME DATA STREAM

(75) Inventors: Alexander Gibson Fraser, Bernardsville, NJ (US); Peter Z Onufryk, Flanders, NJ (US); Kadangode K. Ramakrishnan, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/465,513

(22) Filed: Dec. 16, 1999

Related U.S. Application Data

(60) Provisional application No. 60/112,999, filed on Dec. 18, 1998.

(51) Int. Cl.[7] .............................................. H04L 12/28
(52) U.S. Cl. .............................. 370/395.1; 370/395.62; 370/395.63; 370/395.64; 370/395.65; 370/470; 370/474
(58) Field of Search ............................ 370/389, 395.1, 370/395.21, 395.51, 395.52, 395.6, 395.61, 395.63, 395.64, 395.65, 401, 402, 470, 471, 473, 474, 475, 476, 395.62

(56) References Cited

U.S. PATENT DOCUMENTS 5,487,064 A * 1/1996 Galand et al. ................. 370/60
6,141,788 A * 10/2000 Rosenberg et al. ......... 714/774
6,304,574 B1 * 10/2001 Schoo et al. ................. 370/401
2001/0042114 A1 * 11/2001 Agraharam et al. ........ 709/223

OTHER PUBLICATIONS

S. Casner, V. Jacobson, "Compressing IP/UDP/RTP Headers for Low–Speed Serial Links," Internet Engineering Task Force, Network Working Group, (1997) pp. 1–19.
V. Jacobson, "Compressing TCP/IP Headers for Low–Speed Serial Links," Network Working Group (1990), pp. 1–41.
H. Schulzrinne, S. Casner, R. Frederick, V. Jacobson, "RTP: A Transport Protocol for Real–Time Applications," Network Working Group (1996), pp. 1–63.
F. Audet, "H.323 voice stream packetization on ATM," ATM Forum, Singapore, Dec. 1997.
D. Alley et al., "Voice and Telephony Over ATM to the Desktop Specification," The ATM Forum Technical Committee (1997), pp. 1–38.

* cited by examiner

*Primary Examiner*—Dang Ton
*Assistant Examiner*—Shick Hom
(74) *Attorney, Agent, or Firm*—Henry T. Brendzel

(57) ABSTRACT

Method and device provide for the encapsulation of control information in a real-time data stream. In one embodiment a method of encapsulating data in an information frame is provided. This information frame has a payload portion and a trailer portion wherein the trailer portion is designated for control data and the payload portion is designated for real-time data. In use control data is inserted into the payload portion of the information frame and an extension bit is used to signify the presence of control data in the payload portion of the information frame. The information frame is then transmited over a virtual circuit.

27 Claims, 5 Drawing Sheets

METHOD AND APPARATUS FOR THE ENCAPSULATION OF CONTROL INFORMATION IN A REAL-TIME DATA STREAM

CROSS-REFERENCE TO RELATED APPLICATIONS

This application claims the benefit of U.S. Provisional Patent Application Ser. No. 60/112,999 filed Dec. 18, 1998, and entitled "Encapsulation of Real-Time Data Including RTP Streams Over ATM."

FIELD OF THE INVENTION

The present invention relates to the transmission of information through communication networks. More particularly, the present invention regards methods and devices for encapsulating control information in a real-time data stream.

BACKGROUND

There is considerable interest in the transport of real-time data streams over Virtual Circuit (VC) communication networks. In a VC communication network, two remote users are linked by a logical or simulated circuit between them, a simulated circuit that behaves like a hard wired circuit directly linking the two remote users. Once this virtual circuit is established the two remote users are free to communicate over the network in an efficient and effective manner. Virtual circuit networks include Asynchronous Transfer Mode (ATM) based networks.

ATM networks employ a network transmission protocol that utilizes individual cells of information to compose packets, called information frames, used to transmit an information stream over a network. These packets or information frames need not be sent in synchronization with a system clock, but may be sent at random intervals over the network. Not needing a synchronization clock to time the beginning and end of each transmission frame, each frame is designed to contain start and stop codes to facilitate their use by the end user. An advantage of this non-synchronized or asynchronous transmission method is that it can efficiently utilize network resources by filling voids in the data streaming over the network.

In order to implement this asynchronous transfer of information, several protocols have been developed to standardize the transmission and receipt of information frames over an ATM network. Two of these protocols are ATM Adaptation Layer 5 (AAL5) and ATM Adaptation Layer 2 (AAL2). The AAL5 protocol utilizes a standard information frame and is favored for encapsulating voice in the voice over ATM desktop activity while the AAL2 Adaptation Layer also utilizes a standard information frame but is favored for multiplexing several voice streams over an ATM virtual circuit.

A third type of protocol, Internet Protocol (IP), also exists for transmissions of data. When data, such as audible speech, is sent over an Internet Protocol (IP) based network the voice information is also sampled and packetized into information frames for transport over the network. These information frames are encoded with three layers of headers. These headers carry control information used in the interpretation and reconstruction of the information streams back into their original state. The three headers employed are: (a) a Real-Time Transport Protocol (RTP) header; (b) a User Datagram Protocol (UDP) header; and, (c) an Internet Protocol (IP) header. Together they are designated as the RTP/UDP/IP header. These RTP/UDP/IP headers are appended to each packet.

In a transmission over an IP network it is not unusual for the RTP/UDP/IP header to remain unchanged between packets carrying the real-time information over the network. Not until new control information needs to be sent will some of the header information change from the previously sent packet. This known method of re-sending unchanged header information is wasteful and repetitive as it overloads network resources and relegates the receiving user to read and interpret the same header information over and over again. In sum, in an IP network, even though most of the RTP/UDP/IP header information from the previous packet has not changed, the RTP/UPD/IP header information is nevertheless appended to the data packet, transmitted over the network, received by the receiving user, and read by the user.

In addition to the repetitive nature of the transmission of RTP/UDP/IP headers in an IP network, the headers size, as noted, unnecessarily burdens the network infra-structure and reduces its efficiency. For example, when the header information in a packet is large in comparison to the data information being sent, as is typical in an IP transmission frame carrying an RTP/UDP/IP header, network resources are inefficiently spent. Given a typical header size of 40 bytes and a payload size of 40 bytes a network would be operating at a 50% efficiency carrying this information. In other words, half of the networks resources are spent moving control data around and through it.

Therefore, it can be appreciated that a substantial need exists for a Virtual Circuit encapsulation format that supports real-time data without the inefficiencies of the known processes; one that can utilize existing network resources in a more efficient and effective manner during the transmission of real-time data.

SUMMARY OF THE INVENTION

The present invention includes a method and apparatus for reducing the amount of information carried in a stream of packets over a virtual circuit network. In one embodiment a method of encapsulating data in an information frame is provided. This information frame has a payload portion and a trailer portion wherein the trailer portion is designated for control data and the payload portion is designated for real-time data. In use control data is inserted into the payload portion of the information frame and an extension bit is used to signify the presence of control data in the payload portion of the information frame. The information frame is then transmited over a virtual circuit.

In an alternative embodiment of the present invention an information frame compressor, for use in a virtual circuit network for sending information frames between an information frame compressor and an information frame de-compressor, is provided. This alternative embodiment includes a first interface and an encapsulation unit in communication with this first interface. This encapsulation unit is configured to place the real-time information in a payload portion of an information frame, and when necessary to place an extension bit in an extension bit field in a trailer portion of the information frame and to place control information into the payload portion of the information frame. This alternative embodiment also includes a second interface coupled to the encapsulation unit and configured to transmit the information frame over a virtual circuit.

DETAILED DESCRIPTION

The present invention is directed to the encapsulation of real-time data. In one embodiment a versatile encapsulation format for carrying a real-time data stream, such as a voice stream, is provided. In this embodiment the encapsulation format selectively transmits the IP protocol header information (the RTP/UDP/IP header) over a virtual circuit. When the IP protocol header information is needed it is transmitted over the virtual circuit, and, conversely, when it is not needed the header information is not transmitted over the virtual circuit. Therefore, in practicing this embodiment, redundant information is not repetitively transmitted over a virtual circuit as has been done in the past.

Figure 1:
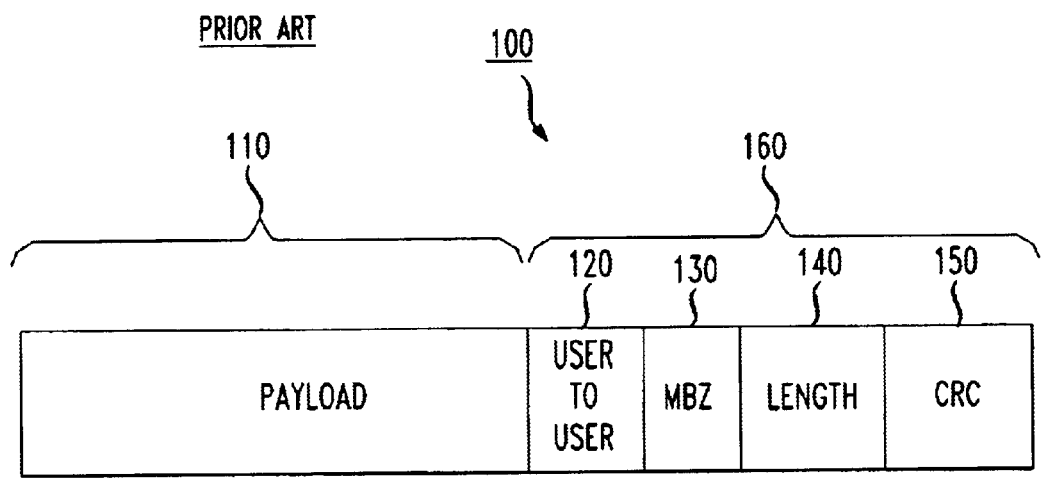
FIG. 1 illustrates an information frame in the AAL5 adaptation layer.

FIG. 1 illustrates an information frame 100 in accordance with the ATM Adaptation Layer Type 5 (AAL5) protocol. The information frame 100 in FIG. 1, not yet modified in accordance with an embodiment of the present invention, includes a variable length payload portion 110 and a trailer portion 160, the payload portion 110 being designated to carry real-time data and the trailer portion 160 being designated to carry control or header information. The variable length payload portion 110 may be adjusted from one to a maximum of 65535 bytes to accommodate payloads of different lengths. The trailer portion 160 comprises: a single octet user-to-user field 120 for data to be transmitted transparently between users; a single octet Must Be Zero (MBZ) field 130 (also known as a common part indicator used to align the trailer in the total bit stream); a two octet length field 140 used to identify the length of the payload portion 110; and a four octet Cyclic Redundancy Check (CRC) field 150 used for error detection.

Figure 2:
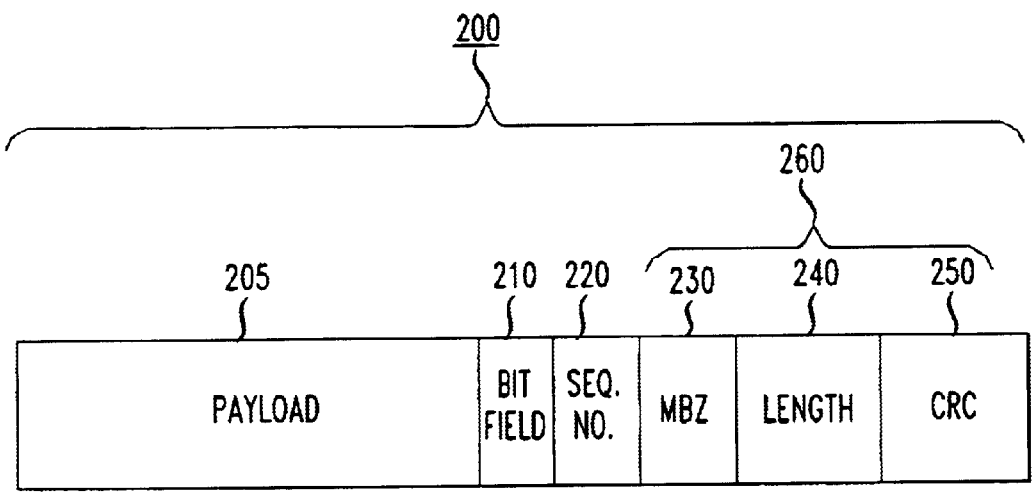
FIG. 2 illustrates an information frame in accordance with a first embodiment of the present invention.

FIG. 2 is an information frame 200 modified in accordance with a first embodiment of the present invention. The information frame 200 in FIG. 2 includes a variable length payload portion 205, for carrying real-time data and a trailer portion 260 for carrying specific frame control or header information. Like the trailer portion 160 in FIG. 1, the trailer portion 260 comprises: a single octet Must Be Zero (MBZ) field 230, a two octet length field 240 for identifying the length of the variable length payload field 205, and a four octet Cyclic Redundancy Check (CRC) field 250, for detecting errors in the packet transmission. In place of the single octet user-to-user field 120 illustrated in FIG. 1, the information frame 200 has been modified to now have a single bit extension field 210 and a seven bit sequence number field 220. This single bit extension field 210 indicates the presence of header information in the variable length payload portion 205 of the information frame 200 while the seven bit sequence number field 220 indicates the position of the information frame 200 relative to other information frames 200 being sent over the network. In other words, the extension bit advises a reader whether or not header information has been placed into a designated portion of the information frame and the sequence number field 220 is used to store information that is used to detect lost frames and may be used to identify frames that have been received out-of-order.

In the embodiment illustrated in FIG. 2, the information frame 200 is designed for transmission over an ATM network using the AAL5encapsulation format. The payload portion of the information frame 200 has been set to 40 bytes to accommodate a 40-byte voice sample although it can vary depending on local conditions. If, however, the length of the variable length payload portion 205 does vary, the length field 240 in the trailer portion will be modified to indicate the length of the payload portion. By employing the AAL5encapsulation format, existing network resources designed to utilize the AAL5format can be utilized with little or no additional programming. Similarly, other encapsulation formats such as ATM Adaptive Layer Type 1 (AAL1) and ATM Adaptive Layer Type 2 (AAL2), could also be used to design the skeleton of the information frame instead of the AAL5 encapsulation format described herein.

The information frame 200 is sent between a compressor and a de-compressor in this embodiment. The compressor receives the information frame from the higher layers of the protocol stack following the OSI model and shrinks the information frame by removing unnecessary control information from the information frame 200 and by placing the required control information into the variable length payload portion 205. Unnecessary control information is information that has either been previously sent to the decompressor, or exchanged between the compressor and decompressor at the time the VC was established. The compressor then transmits the compressed information frame across the VC network for receipt and use by a de-compressor. The de-compressor receives this information frame 200 from the VC network and reconstructs the information frame using existing header information as well as any header information resident in the variable length payload field 205. The de-compressor then passes the reconstructed information frame up through the higher layers of the protocol stack following the OSI model.

Both the compressor and the de-compressor in this embodiment may contain network interfaces for interfacing with the VC network and for interfacing with other components within the protocol stack following the OSI model. The compressor may also contain an encapsulation unit such as a micro-processor, or E-PROM, that is programmed to facilitate the placement of the header information into the variable length payload portion 205 of the information frame. Similarly the de-compressor may contain a de-encapsulating unit, such as a micro-processor or E-PROM, that is programmed to facilitate the removal of header information from the variable length payload portion 205 of the information frame and the reconstruction of the information frame.

Further describing the embodiment of FIG. 2, upon receiving the real-time data, the encapsulation unit of the compressor takes the header information which must be transmitted and is not unnecessary and places it into the variable length payload portion 205 of the information frame 200. After placing the header information into the variable length payload portion 205, the encapsulation unit modifies the single extension bit field 210 by placing a "1" within the extension bit field 210 to signify the presence of control data in the variable length payload field 205. The compressor then transmits the packet over the network. Upon receipt at the other end of the network the de-compressor performs similar but opposite steps. After the de-compressor receives the information frame 200 through its interface the un-encapsulation unit of the de-compressor reads the extension bit field 210 to determine if header information is present in the variable length payload portion 205 of the information frame. If a "1" is present in the single bit extension field 210 the un-encapsulation unit looks for header information in the variable length payload portion 205 of the information frame. Conversely, if a "0" is present in the single bit extension field 210 the un-encapsulation unit does not look for header information in the variable length payload portion 205 but instead reuses the existing header information. Then, once the un-encapsulation unit has properly added the requisite control information to the information frame 200, the de-compressor sends the rebuilt information frame back up the protocol stack following the OSI model for subsequent use by an end user.

Figure 3:
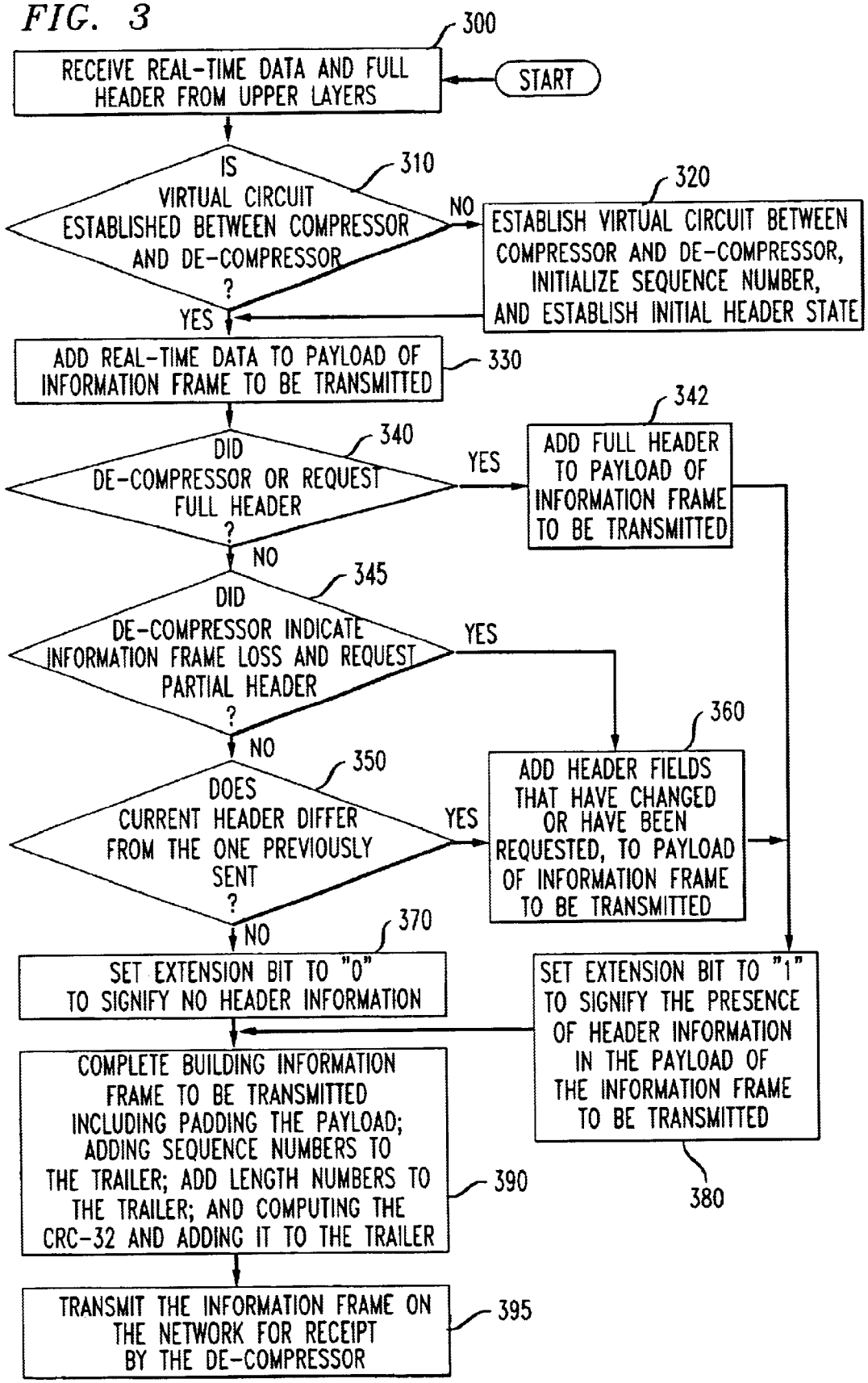
FIG. 3 illustrates a flow diagram of the steps executed by a compressor in accordance with a second embodiment of the present invention.

FIG. 3 is a flow chart of the steps taken by a compressor in accordance with a second embodiment of the present invention. The compressor in FIG. 3 is an interface between the ATM Virtual Circuit and the upper or higher layers of the protocol stack following the OSI model. At step 300 the compressor receives real-time data and a full RTP/UPD/IP header from upper layers of the protocol stack following the OSI model. This real-time data can come from various sources including a LAN-based packet telephone and a personal computer. Next, at step 310, the compressor determines if a virtual circuit has been established between it and a de-compressor, which is a network unit located at the other end of the network and is designated to receive the real-time data being transmitted by the compressor. If the compressor determines, at step 310, that a virtual circuit was established, step 320 would be skipped. If, however, a virtual circuit had not been established, the compressor would proceed to step 320 and establish a virtual circuit with the de-compressor. Concurrent with establishing this virtual circuit, the compressor will also initialize the sequence number used to organize and order the information frames that will be sent over the network and will establish the initial RTP/UDP/IP header settings or header state with the de-compressor. Establishing this header state can be accomplished by adding the initial header settings to the signaling between the compressor and the de-compressor or by including the header settings in the first transmission frame that is sent. This initial header state will be the header state utilized by the de-compressor until the de-compressor receives updated header information as described below.

Next, having established a virtual circuit at step 320 or having determined that a virtual circuit exists at 310, step 330 is performed. At step 330, real-time data that has traveled through the protocol stack from a data source is added to the variable payload portion of an information. Now, before the information frame containing the real-time data in its variable payload portion is transmitted, the compressor verifies, at step 340, whether or not the de-compressor has requested a full header. If the de-compressor has requested a full header, the compressor will add the full RTP/UDP/IP header to the variable length payload portion of the information frame and then proceed to step 380.

If, at step 340, the compressor determines that the de-compressor did not request the full RTP/UDP/IP header the compressor proceeds to step 345 where the compressor determines if the de-compressor has indicated a frame loss or has requested a partial header. If it determines that the de-compressor has requested header information the compressor proceeds to step 360 wherein the compressor adds the required header information to the variable length payload portion of the information frame. The compressor then proceeds to step 380 which is discussed below.

If no header loss is detected at step 345 the compressor moves to step 350. At step 350, the compressor determines if the header information for the current real-time data is different from the header information for the previous information frame of real-time data. If the header information has changed the compressor moves to step 360 where the compressor will add the new header information to the variable length payload portion of the information frame. If at step 350 the header information does not differ from the previous information frame sent the compressor will set the extension bit to "0" in order to signify that the header information is unchanged from the previous transmission frame. In other words, if the header information frame from the previous information frame is the same as the header information for the current information frame, the header information will not be added to the payload portion of the information frame. Comparatively, when the header information has changed the extension bit will be set to "1" to signify that the header information has changed and that new RTP/UDP/IP header information has been placed into the payload portion of the information frame. At step 390, the transmission frame, now containing an extension bit set to "0" or "1", is supplemented with other information; the payload is padded so that the information frame contains an integral number of ATM cells as required by AAL5. The CRC is also computed and added to the trailer portion along with the appropriate sequence number and data field length at this time. Now fully assembled, the information frame is transmitted over the network for receipt by the de-compressor at step 395.

Figure 4:
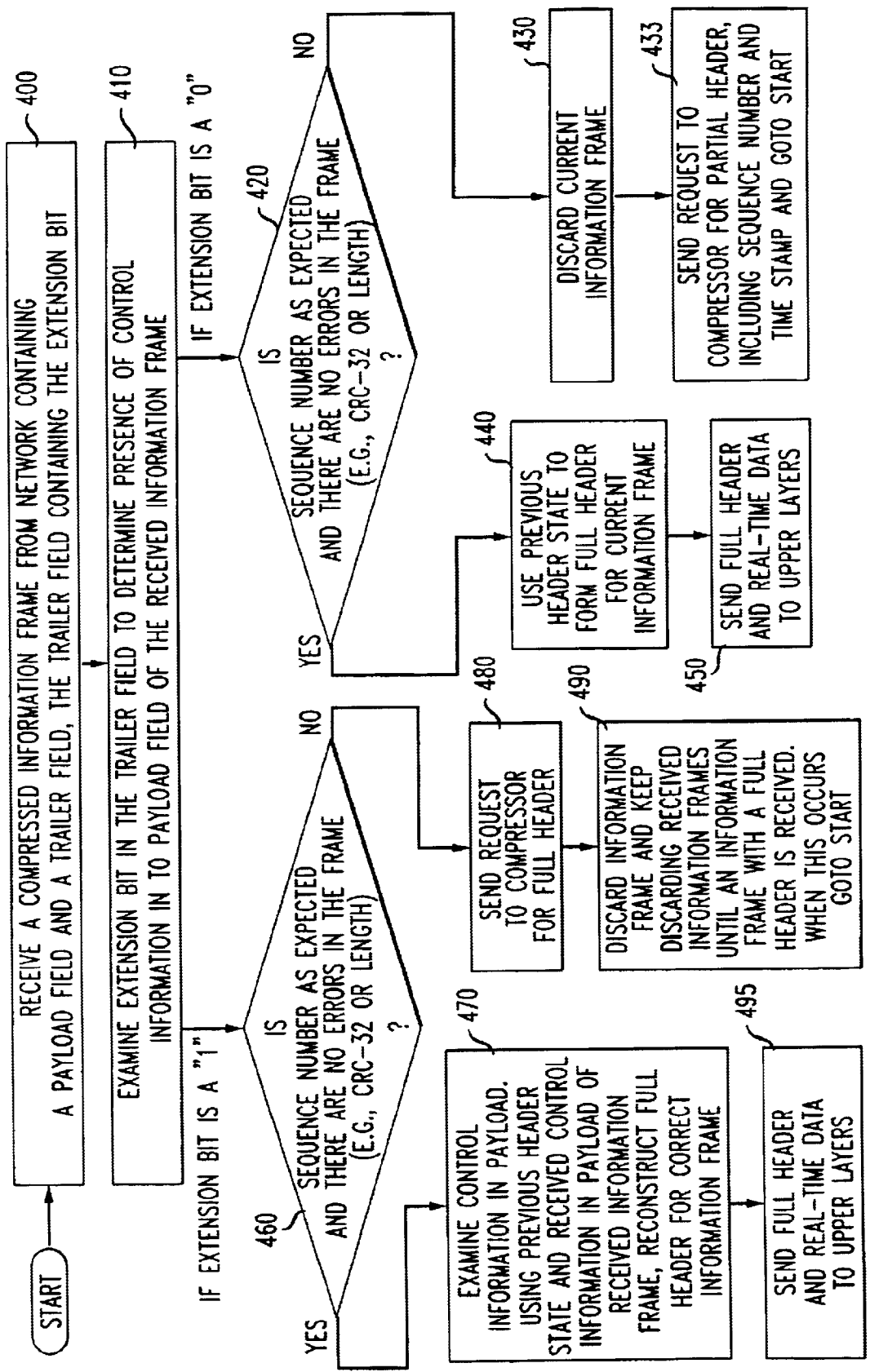
FIG. 4 illustrates a flow diagram of the steps executed by a de-compressor in accordance with a third embodiment of the present invention.

In FIG. 4 the de-compressor performs a similar but opposite function. At step 400 the de-compressor receives a compressed information frame from the virtual circuit. This information frame contains both a payload portion and a trailer portion, the trailer portion containing the extension bit. At step 410 the de-compressor examines the extension bit to determine if control information has been placed into the payload field of the received information frame. If a "1" is present as the extension bit the de-compressor proceeds to step 460 if a "0" is present as the extension bit the de-compressor proceeds to step 420.

At step 420 the de-compressor verifies that there are no errors in the information frame. For example, it verifies that the sequence numbers are continuous and that the length and CRC frames do not show any errors. If errors are found the de-compressor proceeds to step 430 and discards the current information frame. Next, at step 433, the de-compressor sends a request over the virtual circuit to the compressor for partial header information including sequence numbers and time stamp information. The de-compressor then goes to start and awaits the next information frame.

If no errors are found at step 420, the de-compressor will proceed to step 440. At step 440 the previous header state is referenced to complete and form the full header for the current information frame. Now decompressed, and again containing the full RTP/UDP/IP header, the information frame is transmitted up through the higher OSI layers for use by an end user.

At step 460, like step 420, the de-compressor verifies that there are no errors in the information frame. As noted, it verifies that the sequence numbers are continuous and that the length and CRC frames do not show any errors. If errors are found the de-compressor proceeds to step 480 where the de-compressor would send a request back through the virtual circuit to the compressor requesting the full header information be sent to the de-compressor. The de-compressor will then wait at step 490 and discard all subsequently received information frames until an information frame containing a full RTP/UDP/IP header is received. Once received the de-compressor will begin again at step 400.

If at step 460 no errors are found in the information frame the de-compressor proceeds to step 470 where the de-compressor will examine the control information that has been placed into the payload. Then, using previously received control information and the newly received payload information, the de-compressor will reconstruct the full header information for the information frame. Next, at step 495, this recently reconstructed information frame is sent, carrying the real-time data, into the upper layers of the protocol stack following the OSI model, for ultimate receipt and use by an end user.

Figure 5:
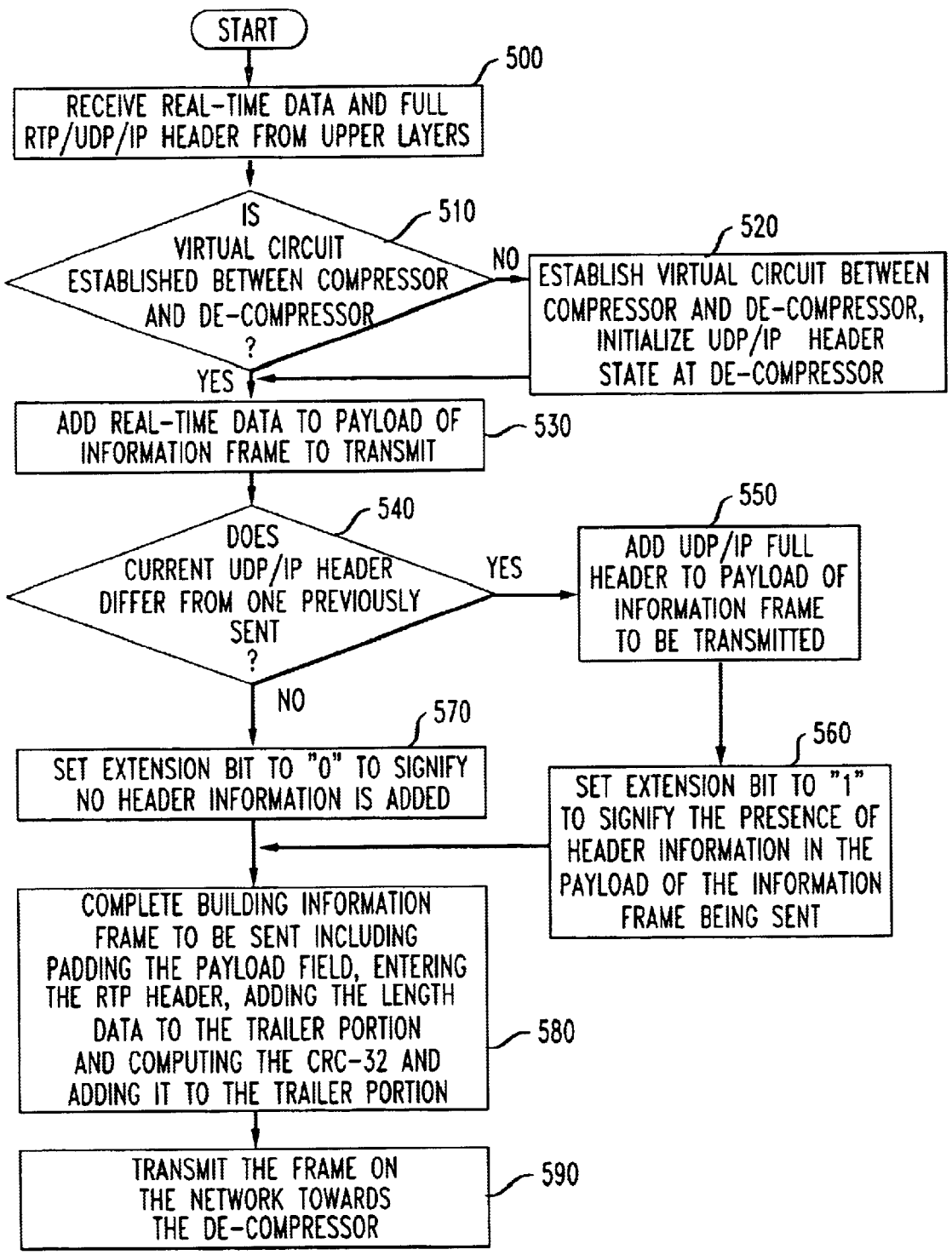
FIG. 5 illustrates a flow diagram of the steps executed by a compressor in accordance with a fourth embodiment of the present invention.

FIG. 5 illustrates a flow chart of the steps executed by a compressor in accordance with a fourth embodiment of the present invention in which the RTP portion of the RTP/UDP/IP header is not placed into the payload portion but is rather transmitted with each frame. At step 500 the compressor receives real-time data and full RTP/UDP/IP header information from upper layers of a protocol stack following the OSI model. Next, at step 510, the compressor determines if a virtual circuit has been established between the compressor and the de-compressor. If a virtual circuit has been established the compressor proceeds to step 530. If a virtual circuit has not been established the compressor establishes a virtual circuit with the de-compressor and initializes the header state with the de-compressor at step 520. Then, at step 530, real-time data is added to the payload portion of the information frame for transmission. Next, at step 540, the compressor determines if the UDP or IP headers differ from previous headers sent. If they differ then both the UDP and the IP header will be added to the variable length payload portion at step 550 and the extension bit will be set to "1" at step 560. Conversely, if the UDP and IP headers do not differ the compressor will proceed to step 570 where the extension bit will be set to "0" to signify that no header information has been added. Then, at step 580, which follows both step 560 and step 570, the compressor completes the construction of the information frame. Step 580 includes filling the variable length payload portion with real-time data and adding length information and CRC information to the trailer. Then, at step 590, the information frame is transmitted across the network to the de-compressor.

Figure 6:
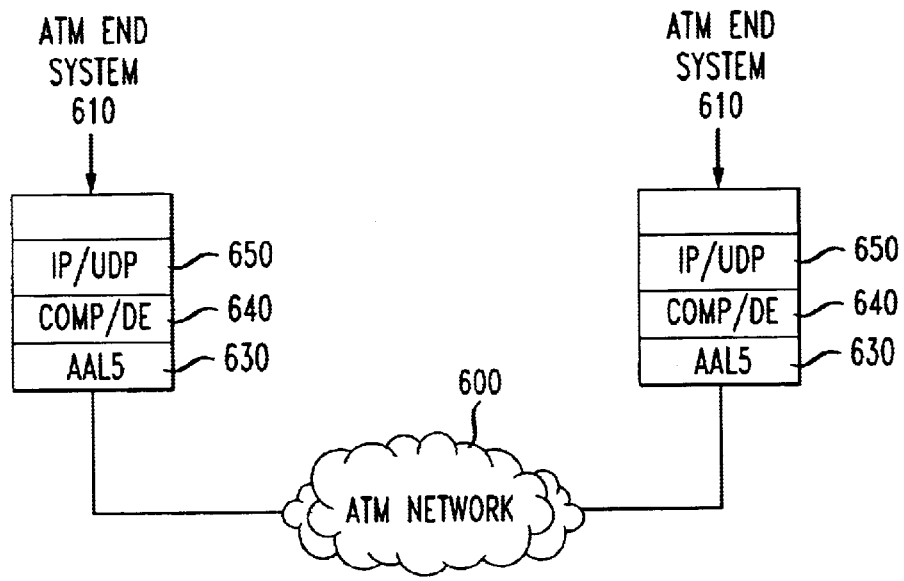
FIG. 6 illustrates a fifth embodiment of the present invention as applied to an ATM network.

FIG. 6 illustrates a compressor/de-compressor pair as employed within an ATM network. In FIG. 6 an ATM end system 610 employing a protocol stack following the OSI model is shown. This ATM end system 610 includes an IP/UDP layer at 650, a compressor/de-compressor at 640, the AAL5 network layer at 630 and an ATM network 600 linking the AAL5 network layer 650 of two separate ATM end systems 610. The compressor/de-compressor 640 in this embodiment performs the functions of both a compressor and a de-compressor as described above. Depending upon which function was required, the compressor/de-compressor would behave accordingly and pass information up or down the ATM end system 610. As illustrated, the compressor/de-compressor 640, is interfaced between the IP/UDP layer 650 and the AAL5 network layer 630. It is here that the compression and decompression of the header information takes place. Because of this embedded location the compressor/de-compressor activities go unnoticed to the ATM network 600 thereby facilitating the use of existing network protocols and obviating the need for extensive programming efforts to utilize the compression and de-compression techniques described above.

Figure 7:
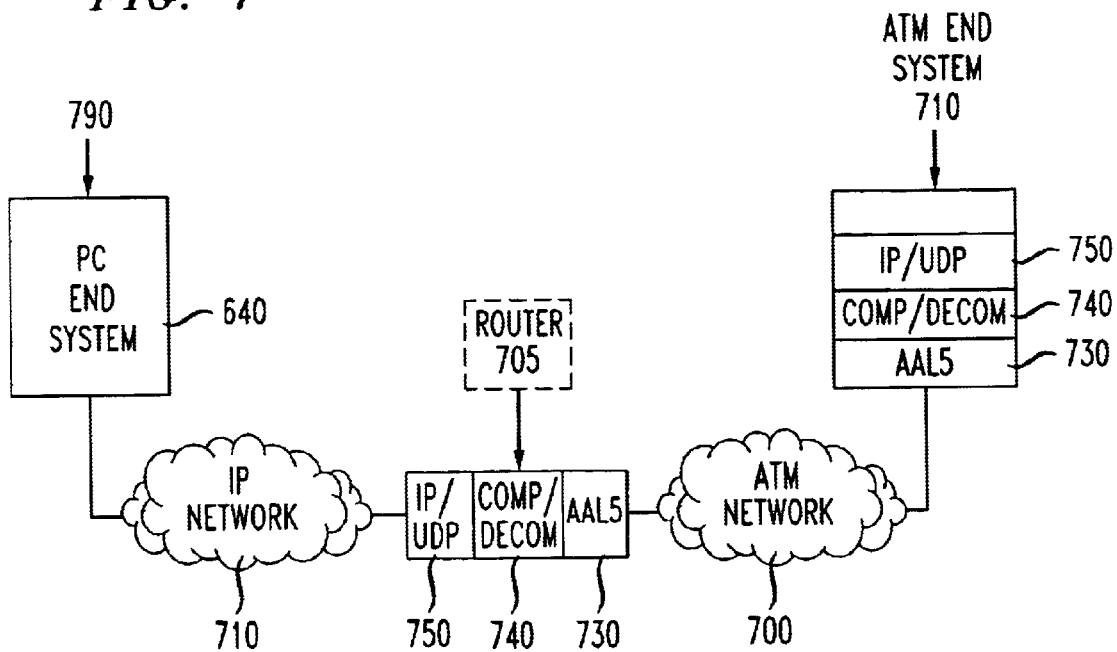
FIG. 7 illustrates a sixth embodiment of the present invention being utilized in the linking of an IP Network and an ATM Network.

FIG. 7 illustrates a compressor/de-compressor pair employed within a router 705 bridging an IP Network 770 with an ATM Network 700. In FIG. 7 a PC end system 790 generates IP packets for transport over the IP network 770. This IP traffic travels over the IP network 770 until it reaches the IP layer 750. Next, the traffic progresses to the compressor/de-compressor 740 wherein the compressor/de-compressor 740 removes the IP header information (i.e., IP, UDP, and RTP headers or IP and UDP headers) and compresses the IP packet. This compressed IP packet travels from the AAL5 layer 730, over the ATM network 700, to the other AAL5 layer 730 located in the ATM end system 710. Upon receipt of the information frame from the AAL5 layer 730 the compressor/de-compressor 740 de-compresses the IP packet and passes the real-time stream to the IP/UDP layer 750 where it will pass before ultimately reaching the end user. By placing the IP header information into the payload portion of an AAL5 information frame the IP traffic is able to travel over an ATM network while using existing ATM protocols.

Although ATM and IP system architectures were used to illustrate the above embodiments other architectures and compression schemes may also be used. For example, in an yet another alternative embodiment, the RTP/UDP/IP header, may also be compressed when going over a Point-to Point-Protocol (PPP) link. As a virtual circuit in an ATM network is likely to look like a PPP link, the compressed packet may be carried all the way across the ATM network and a PPP link until arriving to the endpoint, where the decompression would occur. Alternatively, instead of selectively sending complete header information in the payload portion of the information frame, a kernel or piece of data, which can be used to reconstruct the header information at the de-compressor, can instead be sent. This kernel, when received by the de-compressor, could be utilized in an algorithm to reconstruct the header rather than requiring the entire header be included in the packet. In other words, rather than sending complete headers in the payload portion of the information frame, seeds of data, from which the header information can be derived, may be sent in the payload portion of the information frame. Once received the de-compressor could reconstruct the header based upon these seeds of data and the existing parameters of the virtual circuit.

Similarly, and as mentioned above, still other alternative embodiments of the present invention can be employed in other networks utilizing the equivalent of virtual circuits. For example, an embodiment of the present invention may be employed in DOCSIS channels where a SID is used in the same manner as a virtual circuit identifier is used in an ATM network.

In addition, still other alternative embodiments may also include variations in the number of payload portions and trailer portions employed in each packet. For example, in packets such as TCP packets where portions of the header information changes more frequently than others, the packet can be aportioned into quarters with the header information being placed in two of these quarters. Then, as needed, the header information would be updated with the compression techniques discussed above. An advantage of this embodiment is that the entire header would not need to be resent every time a portion of the header information had changed. Instead, the unchaged portion would continue to be compressed and only the changing information of the header would need to be resent in one of the identified quarters; consequently, three quarters of the packet would remain available to carry payload information.

In addition, although both software and hardware are described above to control various functions, these functions can be performed using either software, hardware or a combination of software and hardware. Moreover, this software may be stored on a medium, such as, for example, a hard or floppy disk or a Compact Disk Read Only Memory (CD-ROM), in the form of instructions adapted to be executed by a processor. These instructions may also be stored on the medium in a compressed and/or encrypted format.

Therefore, the present invention more efficiently utilizes network resources by not repetitively sending redundant header information over a network. In one embodiment of the present invention packet data may be partitioned into data that must be sent with each packet (e.g. real-time) and data that need not be sent with each packet as it may be determined or derived from the virtual circuit context and history. Then, by selectively transmitting this information, the productivity of the network is increased and the burden on the infrastucture to carry the information is decreased.

As described above, a method and apparatus for encapsulation of control information in a real-time data stream is provided. The disclosed embodiments are illustrative of the various ways in which the present invention may be practiced. Other embodiments may also be implemented by those skilled in the art without departing from the spirit and scope of the present invention.

What is claimed is:

1. A method of encapsulating data in an information frame having a payload portion and a trailer portion, the trailer portion including a Cyclic Redundancy Check (CRC) field, a length field, an MBZ field, an extension bit and a field, and a 7-bit sequence number field, comprising the steps of:
   (a) when said data includes control information, including said control information in said payload portion of the information frame;
   (b) signifying the presence of the control information in the payload portion of the information frame by setting said extension bit to a predefined binary value that designates presence of control information; and
   (c) transmitting the information frame over a virtual circuit.

2. The method of claim 1 further comprising the steps of:
   (d) receiving the transmitted information frame;
   (e) determining whether the extension bit of the received information frame indicates presence of control information in the payload portion of the received information frame; and
   (f) when said extension bit in the received information frame indicates presence of control information, reading the control information from the payload portion of the received information frame.

3. The method of claim 1 wherein said virtual circuit is an Asynchronous Transfer Mode (ATM) Network.

4. The method of claim 1 wherein the control information is Real-Time Transport Protocol/User Datagram Protocol/Internet Protocol (RTP/UDP/IP) header data.

5. A method for transmitting real-time data over an Asynchronous Transfer Mode (ATM) network comprising the steps of:
   (a) providing an information frame having a payload portion, a trailer portion, and an extension bit;
   (b) when necessary to include control information with said real-time data, placing the control information in said payload portion of said information frame;
   (c) adjusting said extension bit to indicate the presence of said control information in said payload portion of said information frame;
   (d) placing a portion or all of said real-time data into said payload portion of said information frame; and,
   (e) transmitting said information frame over the ATM network.

6. The method of claim 5 wherein said trailer portion further comprises a payload length field.

7. The method of claim 6 further comprising the step of inserting in said payload length field a value relating to number of bytes of real-time data and control information that are included in said payload portion of said information frame.

8. The method of claim 5 wherein said information frame transmitted over the ATM network is an ATM Adaptation Layer 5 (AAL5) information frame.

9. The method of claim 5 wherein said control information includes Real-Time Transport Protocol/User Datagram Protocol/Internet Protocol (RTP/UDP/IP) header information.

10. A method of reading an information frames, each containing a payload portion and a trailer portion, and the trailer portion containing an extension bit, comprising the steps of:
    (a) receiving a first information frame from a virtual circuit in a network;
    (b) receiving a second information frame from said virtual circuit in a network;
    (c) storing control information resident in payload portion of the first information frame;
    (d) reading the extension bit in the trailer portion of the second information frame; and
    (e) when the extension bit indicates that the control information in the second information frame has not changed from the first information frame, utilizing the stored control information from the first information frame to read data present in the second information frame.

11. The method of claim 10, wherein the control information includes Internet Protocol (IP) header information.

12. The method of claim 10, wherein step (b) also includes the sub-steps of:
    (i) comparing a sequence number from the second information frame with a sequence number from the first information frame; and
    (ii) determining whether the second information frame has been received in proper order based upon the comparison of the sequence numbers from the first information frame and the second information frame.

13. An information frame compressor for use in a virtual circuit network for sending an information frames between said information frame compressor and an information frame de-compressor, comprising:
    a first interface;
    an encapsulation unit in communication with said first interface and configured to place in a payload portion of the information frame (a) a portion of real-time data present in an applied signal and (b) control information—when present in said applied signal—, and further configured to place a predetermined value in an extension bit field in a trailer portion of said information frame when said control information is placed in said payload portion, and a different value otherwise; and a second interface coupled to said encapsulation unit and configured to transmit the information frame over a virtual circuit.

14. The information frame compressor of claim 13 wherein the information frame is an asynchronous transfer mode (ATM) adaptation layer 5 (AAL5) information frame.

15. The information frame compressor of claim 13 wherein the control information contains Real-Time Transport Protocol/User Datagram Protocol/Internet Protocol (RTP/UDP/IP) header information.

16. The information frame compressor of claim 13 wherein said encapsulation unit is further configured to place a payload length field into the trailer portion of the information frame.

17. An information frame de-compressor comprising:
a first interface configured to receive an information frame from a virtual circuit, the received information frame including a payload portion and a trailer portion, the trailer portion including an extension bit;
an un-encapsulation unit coupled to said first interface and configured to remove control information from the payload portion when status of said extension bit indicates presence of control information in said payload portion, and further configured to create a reconstructed information frame that includes said control information;
a second interface unit coupled to said un-encapsulation unit and configured to transmit the reconstructed information frame.

18. The information frame de-compressor of claim 17, wherein the received information frame is an asynchronous transfer mode (ATM) adaptation layer 5 (AAL5) information frame.

19. An article of manufacture comprising a computer-readable medium having stored thereon instructions adapted to be executed by a processor, the instructions which, when executed, define a series of steps to encapsulate data, comprising:
(a) placing a portion of the data in a payload portion of an information frame that includes a payload portion and a trailer portion;
(b) reconfiguring the trailer portion of the information frame to include a data field designated to indicate whether control information has been placed into the payload portion of said information frame; and
(c) transmitting the information frame.

20. The article of manufacture of claim 19 wherein additional instructions to be executed by a processor are stored thereon that place a sequence number in the trailer portion of the information frame.

21. A computer readable memory having stored thereon instructions adapted to be executed by a processor, the instructions, which when executed, define a series of steps to encapsulate data comprising:
(a) receiving a first packet and a second packet containing real-time information, both packets containing real-time data in a payload portion and containing control information in a trailer portion;
(b) comparing the control information received in said trailer portion of said first packet with the control information received in said second packet; and
(c) when the compared control information has not changed from said first packet to said second packet, removing the compared control information from said second packet and transmitting said second packet over a virtual circuit.

22. The computer readable medium of claim 21 wherein the virtual circuit is an Asynchronous Transfer Mode network.

23. A method of reducing the amount of information carried in a stream of packets over a virtual circuit comprising:
(a) establishing a virtual circuit between a compressor and a decompressor;
(b) transmitting header information from the compressor to the decompressor in a payload portion of some packets; and
(c) deriving header information at the decompressor for a packet from a previously received packet.

24. The method of claim 23 further comprising the sub-step, after step (b) of reading an extension bit in a trailer portion of a packets to determine whether said header information is in the packets.

25. The method of claim 23 further comprising the sub-step, after step (b) of sending a request to the compressor to resend header information.

26. The method of claim 23 further comprising the sub-step, after step (b) of:
(i) reading an extension bit to determine whether said header information is in a trailer portion of each of said packets; and
(ii) extracting said header information from each of said packets those extension bit indicates presence of said header information.

27. The method of claim 23 further comprising the sub-steps, after step (a) of:
(i) placing said header information in a payload field of a packet of said stream of packets;
(ii) indicating the presence of said header information in the payload field with an extension bit in a trailer portion of said packet.

* * * * *